Dec. 26, 1961

R. Z. HRICAK 3,014,286

GUIDE TO LANGUAGE STUDY

Filed July 25, 1960

INVENTOR.
RICHARD Z. HRICAK
BY
ATTORNEY

Dec. 26, 1961 R. Z. HRICAK 3,014,286
GUIDE TO LANGUAGE STUDY
Filed July 25, 1960 2 Sheets-Sheet 2

INVENTOR.
RICHARD Z. HRICAK
BY
ATTORNEY

3,014,286
GUIDE TO LANGUAGE STUDY
Richard Z. Hricak, Mamaroneck, N.Y.
(55 Willow Ave., Pelham, N.Y.)
Filed July 25, 1960, Ser. No. 45,162
2 Claims. (Cl. 35—35)

This invention relates to a guide or guides to language study. It is well known that persons of one nationality, who are perhaps very familiar with only one language, have great difficulty in learning to pronounce clearly and understandably certain sounds in another language which they are endeavoring to learn, because some of the sounds of the unfamiliar language are quite different from any of the sounds with which the person is familiar.

For example, in teaching English and American students to learn French, particularly to pronounce the French sounds "eu," "eux" as they appear in such French words as "ceux," "cieux," "leur" and "peur," difficulties have been encountered.

Likewise, French natives who are entirely familiar with the French language have very considerable difficulty in pronouncing English sounds connected with "th" such as in "the," "that," "those," "these," "through," etc. Also a French native in learning English has difficulty in pronouncing the vowel sounds in the English language such as "au" or "o" as in the words "because," "cause," "false," "pause," "for," etc. French pupils also need assistance in pronouncing the English "r" with which they are not familiar.

The correct pronunciation of the various sounds not only in French and English but various other languages is laregly dependent on the control of the lips, the teeth and the tongue of the speaker.

One object of this invention is to provide a guide or series of guides which are light in weight, sanitary, easily washed or cleansed and not uncomfortable in use. All of the guides embodying this invention are hollow so as not to interfere with the sound emission from the mouth and throat of the learner. Each guide is adapted to be placed in the mouth so as to control and thus assure the correct position of the lips, teeth and tongue of the student in uttering the desired sound. Each guide would preferably be marked so that the user could select the one to assist him in making the desired sound.

In some cases it would be unnecessary to control the tongue, and the guide would fix the position only of the lips and teeth, but most of the desired sounds require control of the three elements above mentioned, namely the lips, the teeth and the tongue.

Several embodiments of the invention are illustrated in the accompanying drawings to which reference will now be had.

FIGS. 1 to 4 particularly illustrate guides suitable for English speaking students in the study of French.

Figure 5:
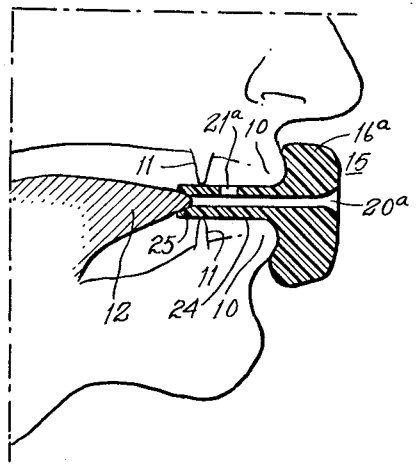

FIG. 5 is a profile sketch illustrating a modified pronunciation guide shown in sectional elevation which is particularly helpful to French native students in the pronunciation of English sounds.

Figure 6:
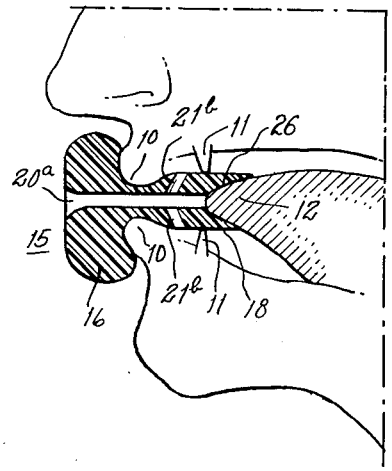
Figure 7:
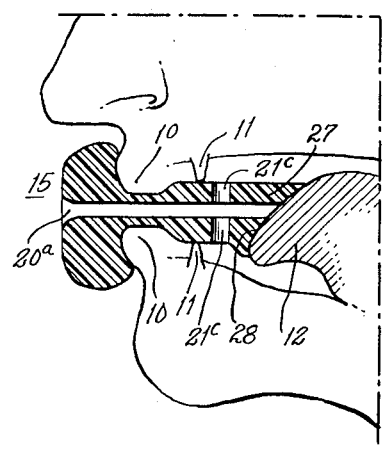

FIGS. 6 and 7 are sectional elevations of modified pronunciation guides which also embody my invention and are adapted to assist French students in the pronunciation of English sounds.

Referring first to FIGS. 1, 2 and 3, 10 designates the lips of the student, 11 the teeth and 12 the tongue. A guide to language study 15 is formed of a plastic, rubber or some other suitable material having an outer mouthpiece 16, a projection 17 which is narrow near the mouthpiece and is shaped to receive the lips 10 of the student, is then somewhat enlarged to guide the position of the teeth 11, and then has a shaped extension 18 having a groove 19 against which the tip of the student's tongue rests.

The guide 15 is hollow from end to end, being provided with a hole or passage 20, so that sounds uttered by the student may be audible. It is also preferably provided with one or more lateral holes or openings 21 so as to allow the sound to pass out even if the inner end is temporarily closed by the tongue.

All of the surfaces of the guide are smooth so that it can be comfortably held in the mouth of the student. When in use, for example, by an English speaking student, he will be greatly surprised and pleased to find that with the help of the guide he is able to make correct sounds which are common to the French language and which are normally difficult for the English student to master.

Thus the student will not only have the usual task of learning the correct grammar and vocabulary, but at the same time by the use of the guides of this invention he will be able to achieve the correct pronunciation.

It will, of course, be understood that there are more sounds in the French language than those above referred to by way of illustration, which are not easy for an English speaking person to master, but they are not very numerous and each such sound will have its own perculiar guide to pronunciation. For example, the guide shown in FIGS. 1, 2 and 3 will assist the student in the pronunciation of the French sounds of "eu," "au," "eur," "aur," etc.

Figure 4:
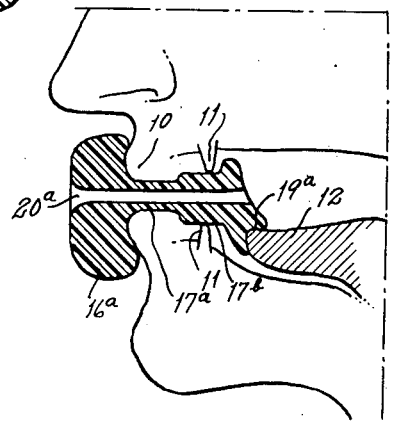
FIG. 4 is a sectional elevation of a modified pronunciation guide which also embodies this invention.

An alternately shaped device for the same purpose is shown in FIG. 4 which may be more comfortable for use by a younger person. In this FIG. 4 the lips are indicated at 10, the teeth at 11, and the tongue at 12. The overall length of the guide from front to back is shorter in FIG. 4 than in the form shown in FIGS. 1 to 3, inclusive. The outer end is similar to 16 of FIG. 1 and is marked 16a. Adjacent thereto is a narrow neck 17a which is shorter but corresponds to 17 in FIG. 1. The inner end of the guide in this modification is formed with a wider portion 17b to space the teeth of the student and a curved tongue guide 19a which does not interfere with the open passage 20a so that no lateral openings such as 21 are required.

FIG. 5 shows a modified form of guide to help native French students to pronounce correctly the English "th" sound as in "the," "that," "this," etc.

It will be observed that the outer end of the guide is formed like that of FIG. 4 and the same reference characters 16a and 20a are employed, but the inner end of the guide here shown has a narrow portion 24 and holds the teeth and lips spaced at the same distance apart. The tongue guide surface 25 tends to close the inner end of the opening 20a so that one or more lateral openings 21a are provided.

FIG. 6 is similar to FIG. 5 but illustrates a modification which may be found more comfortable for use by an adult person as distinguished from a young student in that the teeth are spaced somewhat more widely and the tongue rests on a deeper curved recess 26. Lateral holes 21b correspond to the holes 21 of FIG. 1.

FIG. 7 is another guide which shows the correct positions of the lips, teeth and tongue to assist native French or other foreign students to pronounce the English "r" as in "relative," "rapture," "rat," etc.

This is accomplished by enlarging the inner end of the guide at 27 and beveling the end to form a large tongue guide surface at 28. Lateral holes 21c allow the sound to pass from the mouth and out through the passage 20a.

Figure 1:
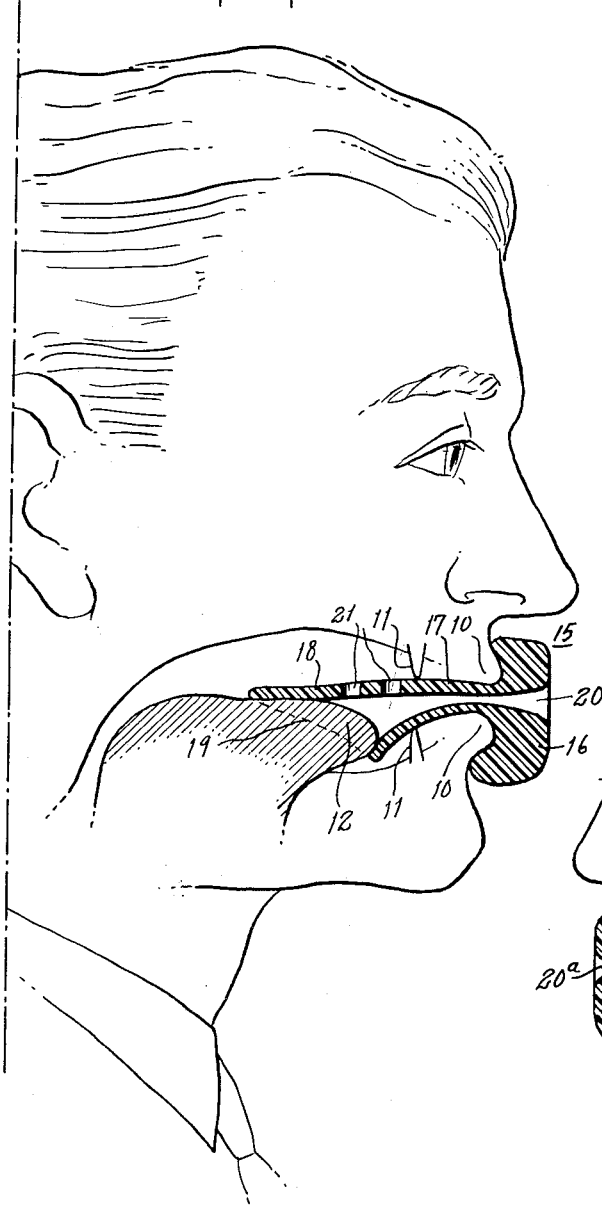
FIGURE 1 shows a profile view of a person with a sectional elevation of a guide to pronunciation held in position to control the lips, teeth and tongue.
Figure 2:
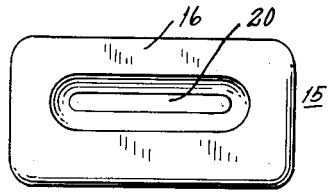
FIG. 2 is a front view of the pronunciation guide of FIG. 1.
Figure 3:
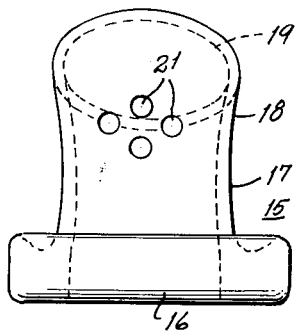
FIG. 3 is an elevation of the same device.

The same reference characters are applied in FIGS. 6, 7 and 8, in FIGS. 1 and 4 and, so far as applicable, they are also employed in FIG. 5, but here there is no tongue control, and the inner end of the guide has an enlargement 25 which spaces the teeth of the user at the proper distance apart.

While a number of different guides have been illustrated and their use described, all are intended to be illustrative only of the invention, and those skilled in the art may readily produce guides to language study which would be helpful, for example, in teaching an English or American student to speak Russian, Spanish, Chinese or some other foreign language and likewise in teaching the foreign student how to pronounce the English sounds which are ordinarily found difficult for the foreign student to articulate.

Only such limitations should be imposed as are indicated by the appended claims.

I claim:

1. A guide to language study comprising a plastic mouthpiece composed of a hollow outer, elliptical member shaped to receive and fashion the lips of the user, a hollow inwardly projecting portion adapted to be held between the teeth and fix their position and a hollow end extension having a concave guide against which the tongue may rest whereby a sound may be correctly uttered in an unfamiliar language.

2. A guide to language study comprising a mouthpiece composed of a hollow outer elliptical member adapted to be held in the mouth and to position the lips of the user, a hollow inner extension narrowed to space the teeth correctly and having a hollow inner end formed to hold the end of the tongue of the user at a predetermined position relative to the teeth and lips, and at least one lateral opening to enable sound to pass from the mouth through the hollow guide when the tongue closes the inner end, whereby the desired sound may be correctly uttered.

References Cited in the file of this patent

UNITED STATES PATENTS

| | | |
|---|---|---|
| 291,071 | Mitchell | Jan. 1, 1884 |
| 608,255 | Gardner | Aug. 2, 1888 |
| 1,389,240 | Clark | Aug. 30, 1921 |
| 1,869,391 | Quintina | Aug. 2, 1932 |

FOREIGN PATENTS

| | | |
|---|---|---|
| 1,027,729 | France | Feb. 18, 1953 |